US005220828A

United States Patent [19]

Sodeno et al.

[11] Patent Number: 5,220,828

[45] Date of Patent: Jun. 22, 1993

[54] THROTTLE VALVE POSITION DETECTING APPARATUS

[75] Inventors: Tsuyoshi Sodeno; Shinsuke Nakazawa, both of Kanagawa, Japan

[73] Assignee: Nissan Motor Co., Ltd., Yokohama, Japan

[21] Appl. No.: 720,678

[22] Filed: Jun. 25, 1991

[30] Foreign Application Priority Data

Jun. 26, 1990 [JP] Japan ........................ 2-165639

[51] Int. Cl.[5] ........................ G01M 15/00

[52] U.S. Cl. ........................ 73/118.1; 123/442

[58] Field of Search ........................ 364/571.05, 431.07; 73/118.1; 123/442

[56] References Cited

U.S. PATENT DOCUMENTS

| | | | |
|---|---|---|---|
| 4,679,440 | 7/1987 | Okamura | 73/118.1 |
| 4,930,079 | 5/1990 | Kondo | 73/118.1 |
| 4,951,206 | 8/1990 | Kyohzuka | 73/118.1 |
| 5,065,721 | 11/1991 | Wiggins et al. | 73/118.1 |

FOREIGN PATENT DOCUMENTS

| | | |
|---|---|---|
| 3737698A1 | 11/1987 | Fed. Rep. of Germany . |
| 4001226A1 | 1/1990 | Fed. Rep. of Germany . |

*Primary Examiner*—Jerry W. Myracle

*Attorney, Agent, or Firm*—Foley & Lardner

[57] ABSTRACT

An apparatus for use with an internal combustion engine having first and second throttle valves located in series within an engine induction passage. The apparatus comprises a first sensor associated with the first throttle valve for deriving a first sensor signal indicative of a first throttle valve position and a second sensor associated with the second throttle valve for deriving a second sensor signal indicative of a second throttle valve position. The first and second minimum values of the first and second sensors are detected. The detected first and second minimum values correspond to minimum positions of the first and second throttle valves, respectively. A difference between the first and second minimum values is calculated and one of the first and second sensor signals is corrected in a direction zeroing the calculated difference. The corrected one of the first and second sensor signals is further corrected based upon a constant corresponding to a difference between the minimum positions of the first and second throttle valves.

4 Claims, 5 Drawing Sheets

THROTTLE VALVE POSITION DETECTING APPARATUS

BACKGROUND OF THE INVENTION

This invention relates to a throttle valve position detecting apparatus for use with an internal combustion engine having two throttle valves located in series within an engine induction passage and, more particularly, to a throttle valve position detecting apparatus for correcting a deviation of two sensor signals for the same throttle valve positions.

For example, Japanese Patent Kokai No. 62-192824 discloses a traction control apparatus for use with an internal combustion engine having first and second throttle valves located in series within an engine induction passage. The first throttle valve is associated through a mechanical linkage with an accelerator pedal. The second throttle valve is associated with a throttle valve actuator controlled by an electric control unit. The control unit controls the second throttle valve to reduce an engine output so as to hold a slip factor within a predetermined range when slip occurs for the vehicle drive wheels. For this purpose, the traction control apparatus produces a target value for the second throttle valve position. A first throttle sensor is provided for deriving a first sensor signal indicative of a first throttle valve position and a second throttle sensor is provided for deriving a second sensor signal indicative of a second throttle valve position. The first sensor signal is used to determine the amount of fuel delivered to the engine. Normally, the greater the first throttle valve position, the greater the amount of fuel delivered to the engine. The second sensor signal is compared with the calculated target value for the second throttle valve position to provide a closed loop control signal in response to a sensed deviation of the detected throttle valve position from the target throttle valve position. The closed loop control signal is used to drive the throttle valve actuator so as to move the second throttle valve in a direction zeroing the sensed deviation.

If the first throttle valve opens for engine acceleration with the second throttle valve being closed to provide a traction control, the amount of fuel metered to the engine will increases in spite of the fact that the amount of air to the engine is limited by the second throttle valve. As a result, an overrich air/fuel mixture enters the engine, causing degraded fuel economy and degraded engine operating performance. In order to avoid the problem, it may be considered to make the fuel delivery control based upon a smaller one of the first and second sensor signals. However, another problem arises when there is a deviation between the first and second sensor signals for the same throttle positions.

Referring to FIG. 1A, there is shown a first case where the first and second throttle valves occupy the same minimum position $\theta 1$ when they are fully closed, but the second sensor signal V2 has a value V20 when the second throttle valve is at the minimum position $\theta 1$, the value V20 being greater than the value V10 of the first sensor signal V1 produced when the first throttle valve is at the minimum position $\theta 1$. As can be seen from FIG. 1A, the value V21 of the second sensor signal V2 is greater than the value V11 of the first sensor signal V1 in spite of the fact that the second throttle valve position at which the second sensor signal V2 has the value V21 is less than the first throttle valve position at which the first sensor signal V1 has the value V11. If the fuel delivery control is based upon the smaller one of the first and second sensor signals during a traction control, an overrich air/fuel mixture will enter the engine, causing engine stall.

Referring to FIG. 1B, there is shown a second case where the first and second throttle valves occupy different minimum positions $\theta 10$ and $\theta 20$, respectively, when they are closed fully, the minimum position $\theta 10$ of the first throttle valve being less than the minimum position $\theta 20$ of the second throttle valve. As can be seen from FIG. 1B, the second sensor signal V2 has a value V22 less than the value V12 of the first sensor signal V1 in spite of the fact that the the position at which the second sensor signal V2 has the value V22 is greater than the position at which the first sensor signal V1 has the value V12. If the fuel delivery control is made based upon the smaller one of the first and second sensor signals when the accelerator pedal is released to close the first throttle valve, an overrich air/fuel mixture will enter the engine, causing engine stall.

SUMMARY OF THE INVENTION

Therefore, it is a main object of the invention to provide a throttle valve position detecting apparatus which can provide an accurate fuel delivery control for an internal combustion engine having first and second throttle valves located in series within an engine induction passage.

Another object of the invention is to provide a throttle valve position detecting apparatus which can compensate for a deviation between the values of first and second sensor signals indicative of positions of the first and second throttle valves for the same throttle position.

Another object of the invention is to provide a throttle valve position detecting apparatus which can ensure an accurate comparison between the first and second sensor signals.

There is provided, in accordance with the invention, an apparatus for use with an internal combustion engine having first and second throttle valves located in series within an engine induction passage. The apparatus comprises first sensor means associated with the first throttle valve for deriving a first sensor signal indicative of a first throttle valve position, second sensor means associated with the second throttle valve for deriving a second sensor signal indicative of a second throttle valve position, and a circuit connected to the first and second sensor means. The circuit includes means for detecting a first minimum value of the first sensor signal, the detected first minimum value corresponding to a minimum position of the first throttle valve, means for detecting a second minimum value of the second sensor signal, the detected second minimum value corresponding to a minimum position of the second throttle valve, means for calculating a difference between the first and second minimum values, means for correcting one of the first and second sensor signals in a direction zeroing the calculated difference, and means for correcting the corrected one of the first and second sensor signals based upon a constant corresponding to a difference between the minimum positions of the first and second throttle valves.

In another aspect of the invention, the apparatus comprises first sensor means associated with the first throttle valve for deriving a first sensor signal indicative of a first throttle valve position, second sensor means associated with the second throttle valve for deriving a second sensor signal indicative of a second throttle valve position, the second sensor signal having a value greater than a value of the first sensor signal for the same throttle position, and a circuit connected to the first and second sensor means. The circuit includes means for detecting a first minimum value of the first sensor signal, the detected first minimum value corresponding to a minimum position of the first throttle valve, means for detecting a second minimum value of the second sensor signal, the detected second minimum value corresponding to a minimum position of the second throttle valve, means for calculating a difference of the second minimum value from the first minimum value, means for adding the difference to the second sensor signal to correct the second sensor signal, and means for adding a constant to the corrected second sensor signal to correct the corrected second sensor signal, the constant corresponding to a difference between the minimum positions of the first and second throttle valves.

In still another aspect of the invention, the apparatus comprises first sensor means associated with the first throttle valve for deriving a first sensor signal indicative of a first throttle valve positions, second sensor means associated with the second throttle valve for deriving a second sensor signal indicative of a second throttle valve position, the second sensor signal having a value less than a value of the first sensor signal for the same throttle position, and a circuit connected to the first and second sensor means. The circuit includes means for detecting a first minimum value of the first sensor signal, the detected first minimum value corresponding to a minimum position of the first throttle valve, means for detecting a second minimum value of the second sensor signal, the detected second minimum value corresponding to a minimum position of the second throttle valve, means for calculating a difference of the first minimum value from the second minimum value, means for adding the difference to the first sensor signal to correct the first sensor signal, and means for adding a constant to the corrected first sensor signal to correct the corrected first sensor signal, the constant corresponding to a difference between the minimum positions of the first and second throttle valves.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1A:
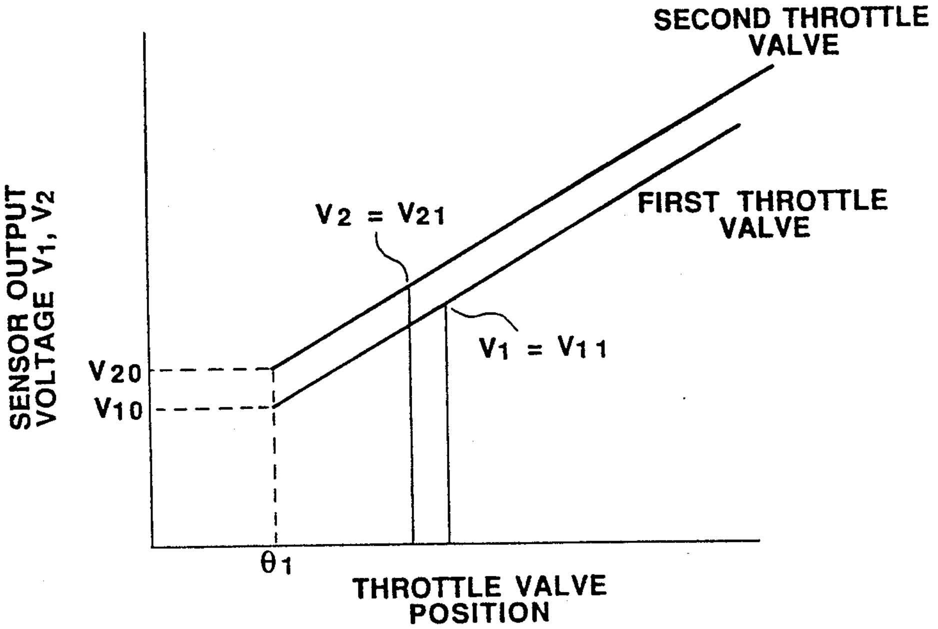
FIGS. 1A and 1B are graphs used in explaining problems associated with a deviation between the values of first and second sensor signals indicative of first and second throttle valves, respectively, for the same throttle valve position.
Figure 1B:
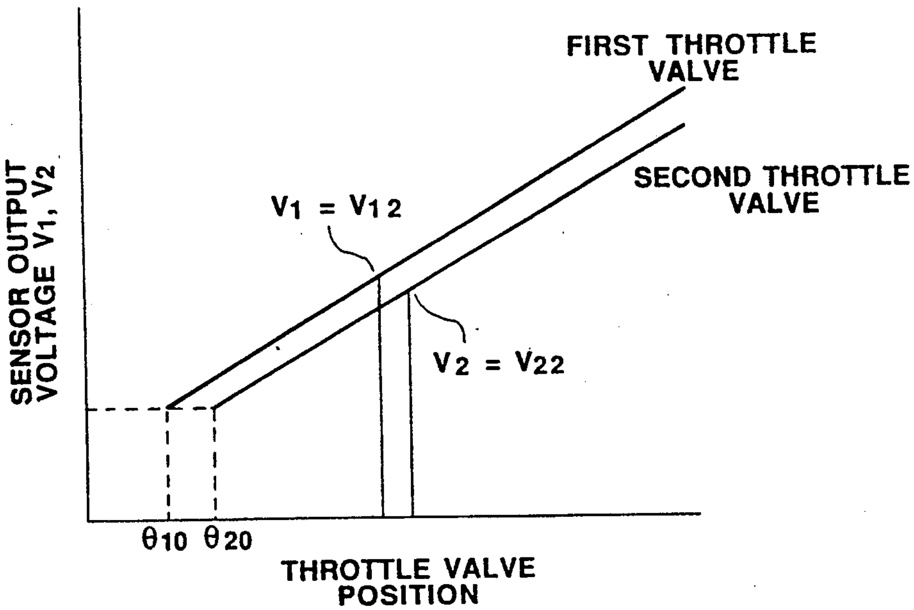
Figure 2:
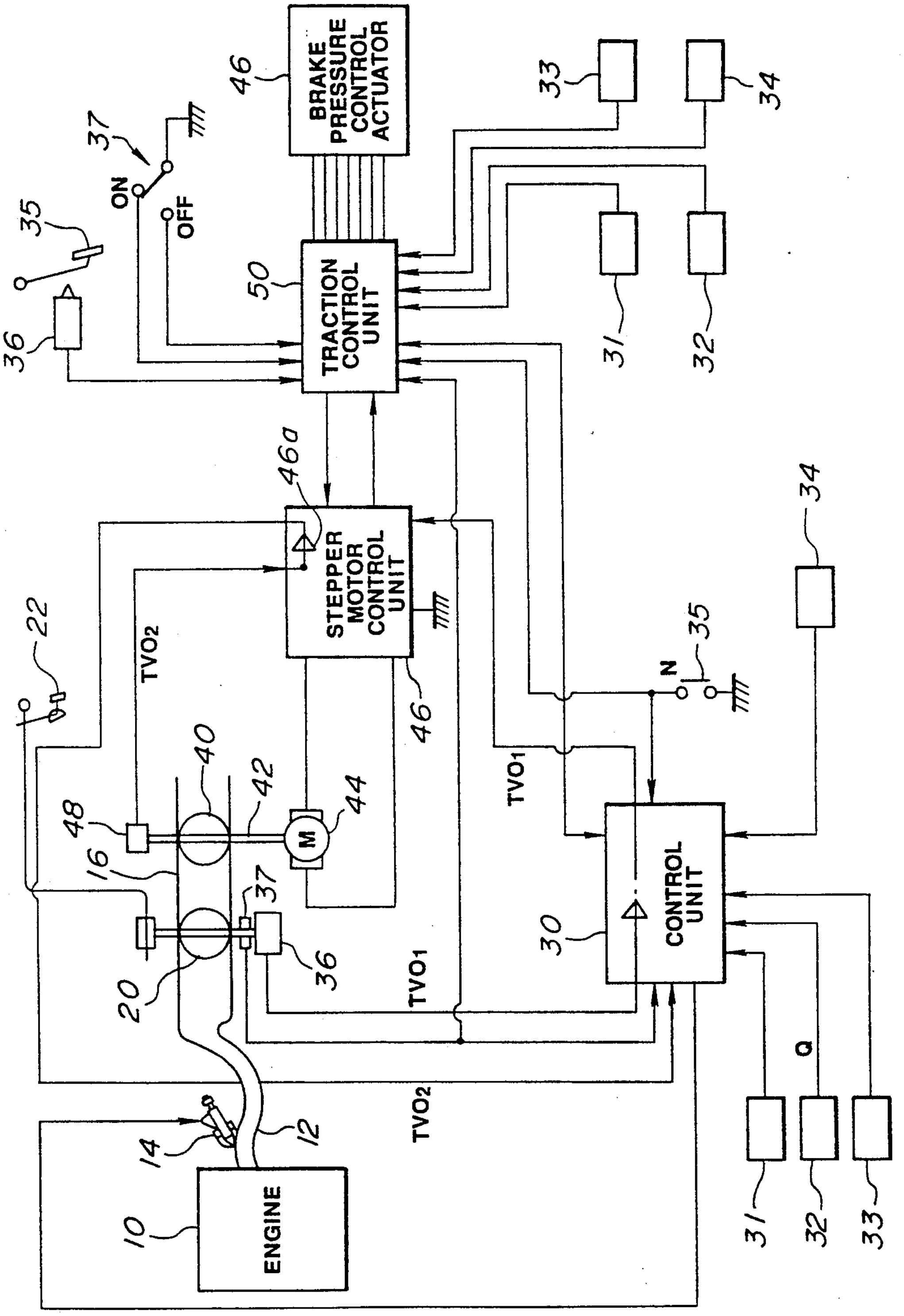
FIG. 2 is a schematic diagram showing one embodiment of a throttle valve position detecting apparatus made in accordance with the invention.

Referring to FIG. 2, there is shown a schematic diagram of a throttle valve position detecting apparatus embodying the invention. An internal combustion engine, generally designated by the numeral 10, for an automotive vehicle includes combustion chambers or cylinders. An intake manifold 12 is connected with the cylinder through an intake port with which an intake valve (not shown) is in cooperation for regulating the entry of combustion ingredients into the cylinder from the intake manifold 12. A spark plug (not shown) is mounted in the top of the cylinder for igniting the combustion ingredients within the cylinder when the spark plug is energized by the presence of high voltage electrical energy. An exhaust manifold (not shown) is connected with the cylinder through an exhaust port with which an exhaust valve is in cooperation for regulating the exit of combustion products, exhaust gases, from the cylinder into the exhaust manifold.

A fuel injector, only one of which is shown at 14, is mounted for injecting fuel into the intake manifold toward the intake valve. The fuel injector 14 opens to inject fuel into the intake manifold when it is energized by the presence of an electrical signal. The length of the electrical pulse, that is, the pulse-width, applied to the fuel injector 14 determines the length of time the fuel injector 14 opens and, thus, determines the amount of fuel injected into the intake manifold.

Air to the engine 10 is supplied through an air cleaner into an induction passage 16. The amount of air permitted to enter the cylinder through the intake manifold is controlled by a first butterfly throttle valve 20 located within the induction passage 16. The first throttle valve 20 is urged to its fully-closed position. The first throttle valve 20 is connected by a mechanical linkage to an accelerator pedal 22. The degree to which the accelerator pedal 22 is depressed controls the degree of rotation of the first throttle valve 20. The accelerator pedal 22 is manually controlled by the driver.

The amount of fuel metered to the engine, the fuel-injection timing and the ignition-system spark-timing are repetitively determined from calculations performed by a control unit 30, these calculations being based upon various conditions of the engine that are sensed during its operation. These sensed conditions include engine speed N, intake air flow Q, vehicle speed, engine coolant temperature, first throttle valve position TVO1, and transmission position. Thus, a crankshaft position sensor CPS 31, an intake airflow meter AFM 32, a vehicle speed sensor VSS 33, an engine coolant temperature sensor CTS 34, a neutral switch N 35, a first throttle sensor TS 36, and an idle position switch 37 are connected to the control unit 30.

The crankshaft position sensor 31 is provided for producing a series of crankshaft position electrical pulses, each corresponding to two degrees of rotation of the engine crankshaft, of a repetitive rate directly proportional to engine speed and a predetermined number of degrees before the top dead center position of each engine piston. The intake airflow meter 32 is responsive to the air flow through the induction passage 16 and produces an intake airflow signal proportional thereto. The vehicle speed sensor 33 is located at a position to sense the vehicle speed. The engine coolant temperature sensor 34 is mounted in the engine cooling system and comprises a thermistor connected to an electrical circuit capable of producing a coolant temperature signal in the form of a DC voltage having a variable level proportional to coolant temperature. The neutral switch 35 is in its "ON" position or closed to supply current from a vehicle battery to the control unit 30 when the transmission is in neutral. The first throttle sensor 36 is a potentiometer electrically connected to a voltage divider circuit for producing a first throttle valve position signal TVO1 in the form of a DC voltage indicative of the first throttle valve position. The idle position switch 37 is in its "ON" position or closed to supply current from the vehicle battery to the control unit 30 when the first throttle valve 20 is at its fully-closed position.

A second throttle valve 40 is located in the induction passage 16 somewhat upstream of the first throttle valve 20. The second throttle valve 40 is normally in its fully-open position. The second throttle valve 40 is connected by a rod 42 to a stepper motor 44. The stepper motor 44 is actuated by a stepper-motor drive-circuit 46 to make a change in the position of the second throttle valve 40 if required. The stepper-motor drive-circuit 46 receives a sensor TS signal from a second throttle position sensor 48 and also a command signal from a traction control unit 50. The second throttle sensor 48 is a potentiometer electrically connected to a voltage divider circuit for producing a second throttle valve position signal TVO2 in the form of a DC voltage indicative of the second throttle valve position. The second throttle valve position signal TVO2 is fed to the stepper motor control unit 46 and also through a buffer 46*a* to the control unit 30.

The traction control unit 50 communicates with the control unit 30 and performs traction and brake controls. The traction control is performed to detect a slip condition based upon the road wheel speeds and suppress the slip by decreasing the engine output torque. For this purpose, a command signal is produced to the stepper-motor drive-circuit 46 which thereby controls the stepper motor 44 to move the second throttle valve 40 in a closing direction. The brake control is performed to avoid slip by decreasing the braking forces applied to the road wheels. For this purpose, control signals are produced for the respective brake pressure control actuators 49 so as to reduce the braking forces applied to the road wheels. These controls are performed based upon various vehicle traveling conditions including road wheel speeds, etc. Thus, wheel speed WSS 51, 52, 53 and 54, a brake switch BS 55, and a traction control switch 56 are connected to the traction control unit 50. The wheel speed sensors WSS 51, 52, 53 and 54 are located to sense the speeds of rotation of the respective road wheels. The brake switch 55 is responsive to the application of braking to the vehicle to close to supply current from the engine battery to the traction control unit 50. The traction control switch 56 is manually operated by the driver to close to supply current to the traction control unit 50 when the traction control mode is selected.

Figure 3A:
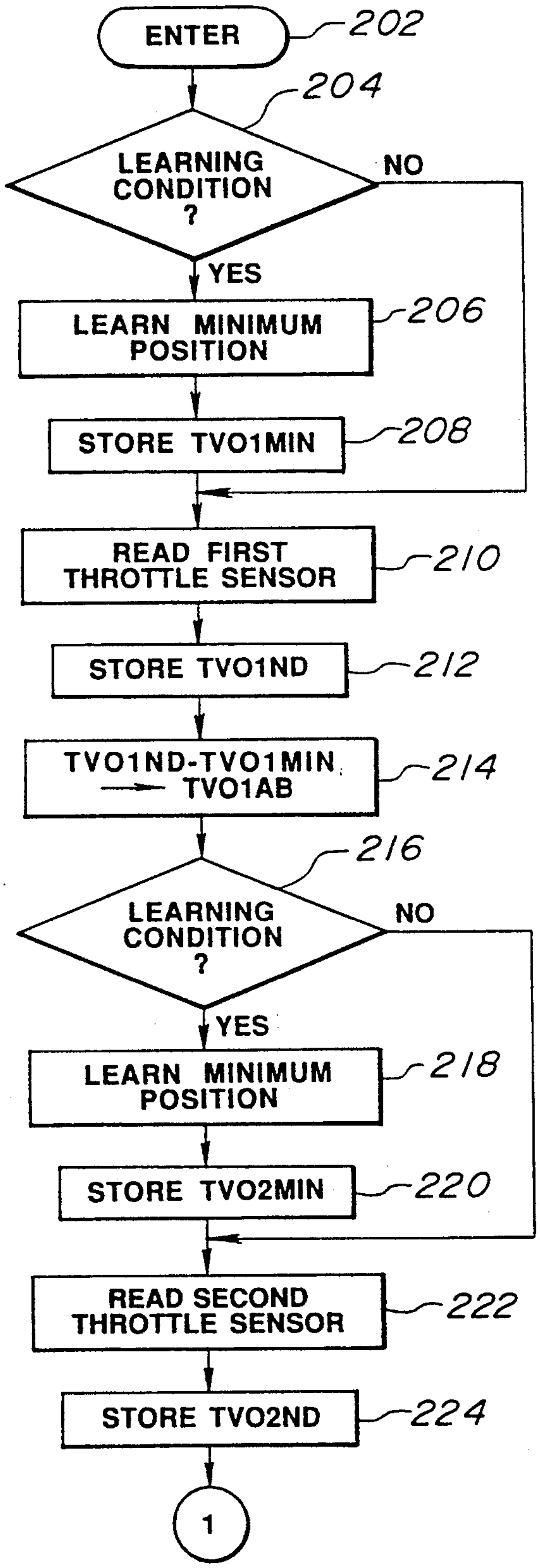
FIGS. 3A and 3B are flow diagrams illustrating the programming of the digital computer used in the control circuit of FIG. 2.
Figure 3B:
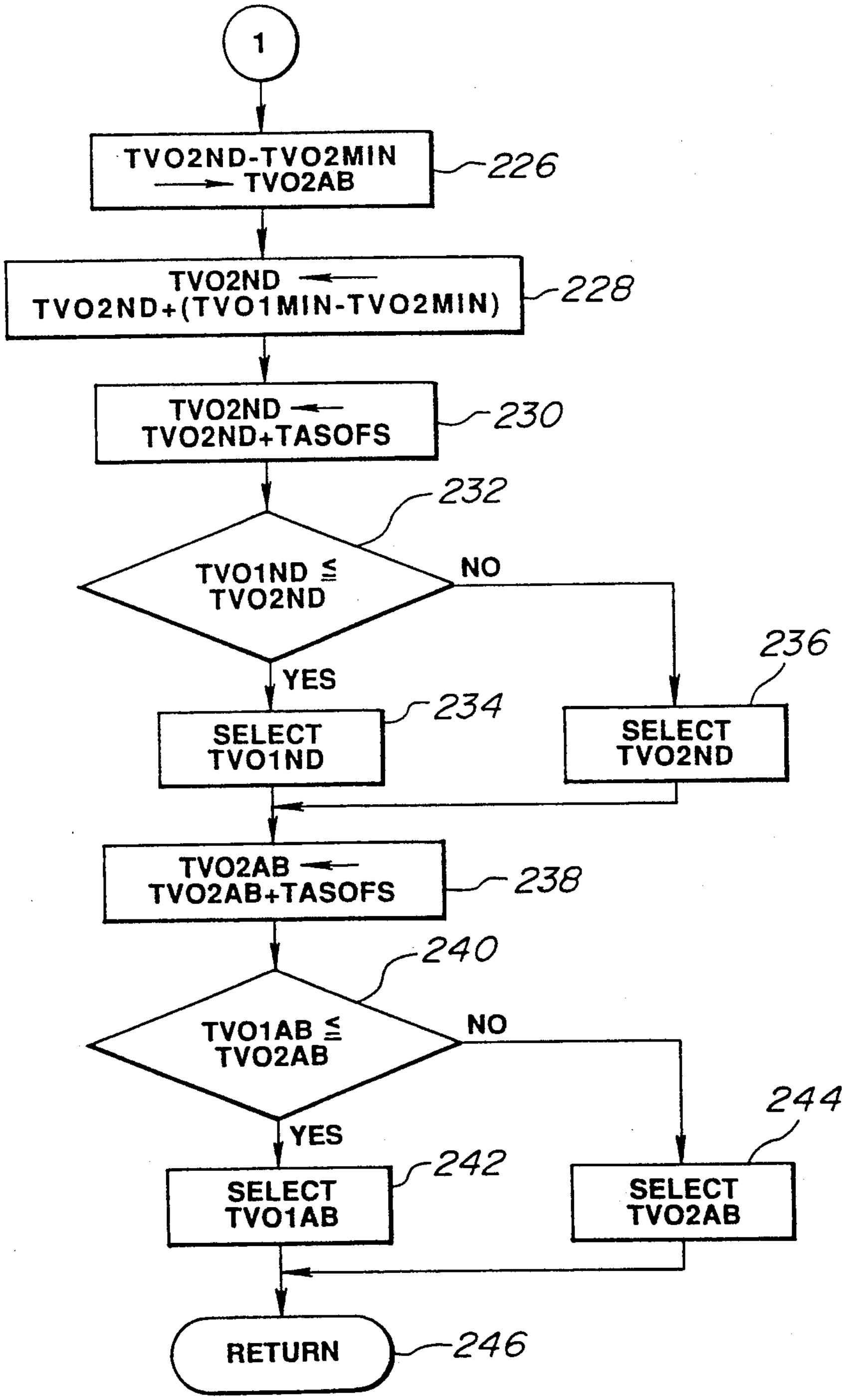

FIGS. 3A and 3B are flow diagrams of the programming of the digital computer 30 as it is used to detect the absolute and relative values of the first and second throttle valve positions for use in a traction control.

The computer program is entered at the point 202. At the point 204 in the program, a determination is made as to whether or not the existing condition is suitable to learn the minimum (or fully-closed) position of the first throttle valve 20. The answer to this question is "yes" and the program proceeds to the point 206 just after the ignition key switch is turned from its "OFF", position to its "ON" position or when the idle position switch 37 is in its "ON" position. At the point 206 in the program, the first throttle valve position signal TVO1 from the first throttle sensor 36 is converted into digital form and read into the computer memory. At the point 208 in the program, the read value is stored as a first learned value TVO1MIN of the minimum position of the first throttle valve 20. The first learned value TVO1MIN may be calculated by weighted averaging the first throttle valve position value read at the point 206 and the last learned value stored at the point 208 in the last cycle of execution of the program. The program then proceeds to the point 210.

If the answer to the question inputted at the point 204 is "no", then the program proceeds directly to the point 210. At the point 210, the first throttle valve position signal TVO1 from the first throttle sensor 36 is converted into digital form and read into the computer memory. At the point 212 in the program, the read value is stored as a first absolute throttle valve position value TVO1ND, that is, the angle of rotation of the first throttle valve 20 with respect to the reference position normal to the axis of the induction passage 16. At the point 214 in the program, a first relative throttle valve position value TVO1AB is calculated by subtracting the first learned value TVO1MIN from the first absolute throttle valve position value TVO1ND. The program then proceeds to the point 216.

At the point 216 in the program, a determination is made as to whether or not the existing condition is suitable to learn the minimum (or fully-closed) position of the second throttle valve 40. The answer to this question is "yes" and the program proceeds to the point 218 when the idle switch 37 is in its "ON" position and when the neutral switch 35 is in its "ON position. At the point 218 in the program, the second throttle valve position signal TVO2 from the second throttle sensor 48 is converted into digital form and read into the computer memory. At the point 220 in the program, the read value is stored as a second learned value TVO2-MIN of the minimum position of the second throttle valve 40. The learned value TVO2MIN may be calculated by weighted averaging the second throttle valve position value read at the point 218 and the last learned value stored at the point 220 in the last cycle of execution of the program. The program then proceeds to the point 222.

If the answer to the question inputted at the point 216 is "no", then the program proceeds directly to the point 222. At the point 222, the second throttle valve position signal TVO2 from the second throttle sensor 36 is converted into digital form and read into the computer memory. At the point 224 in the program, the read value is stored as a second absolute throttle valve position value TVO2ND, that is, the angle of rotation of the second throttle valve 40 with respect to the reference position normal to the axis of the induction passage 16. At the point 226 in the program, a second relative throttle valve position value TVO2AB is calculated by subtracting the second learned value TVO2MIN from the second absolute throttle valve position value TVO2ND. The program then proceeds to the point 228.

Figure 4A:
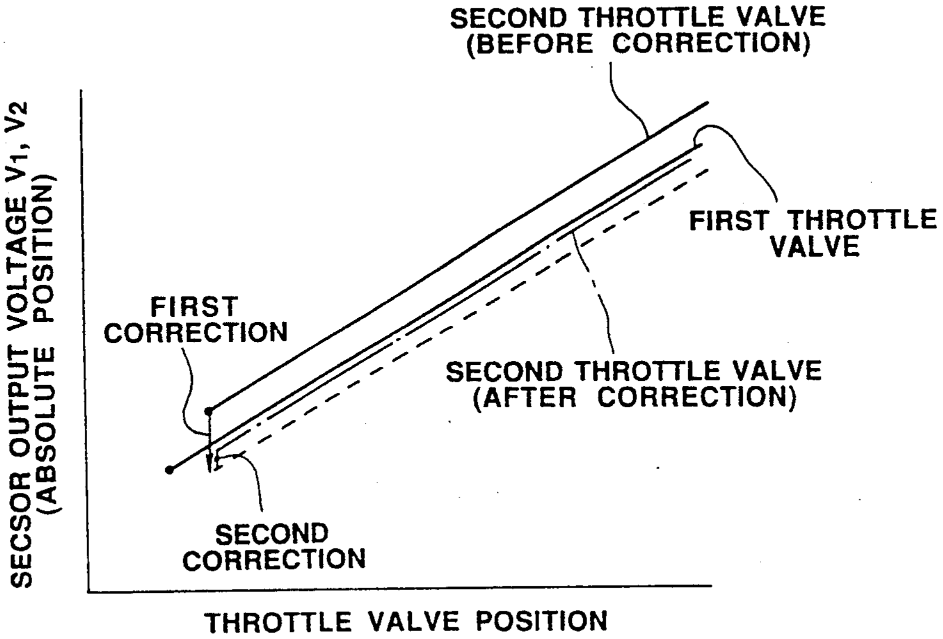
FIGS. 4A and 4B are graphs used in explaining first and second corrections to cancel the deviation between the values of the first and second throttle sensor signals for the same throttle valve position.

At the point 228 in the program, the second absolute throttle valve position value TVO2ND is corrected by calculating a difference (TVO1MIN–TVO2MIN) of the second learned value TVO2MIN from the first learned value TVO1MIN and adding the calculated difference to the second absolute throttle valve position value TVO2ND. Thus, the second absolute throttle valve position value TVO2ND is corrected in a direction canceling the difference between the output voltage TVO2 (TVO2MIN) produced from the second throttle sensor 48 when the second throttle valve 40 is in its minimum position and the output voltage TVO1 (TVO1MIN) produced from the first throttle sensor 36 when the first throttle valve 20 is in its minimum position. The corrected second absolute throttle valve position value TVO2ND is used to update the last second absolute throttle valve position value stored in the computer memory. This first correction is indicated by an arrow directed downward in FIG. 4A.

At the point 230 in the program, the corrected second absolute throttle valve position value TVO2ND. is further corrected by adding a constant K to the corrected second absolute throttle valve position value TVO2ND. The constant K is a predetermined value corresponding to the difference between the minimum positions of the first and second throttle valves 20 and 40, that is, a change in the first throttle valve position signal TVO1 when the first throttle valve 20 changes from its minimum position to the minimum position of the second throttle valve 40. Thus, the corrected second absolute throttle valve position value TVO2ND is further corrected in such a manner that the output voltage TVO2 (TVO2ND) from the second throttle sensor 48 is equal to the output voltage TVO2 from the first throttle sensor 36 when the first and second throttle valves 20 and 40 open at the same angle. The corrected second absolute throttle valve position value TVO2ND is used to update the last second absolute throttle position value stored in the computer memory. This second correction is indicated by an arrow directed upward in FIG. 4A.

At the point 232 in the program, a determination is made as to whether or not the first absolute throttle valve position value TVO1ND is equal to or less than the second absolute throttle valve position value TVO2ND. If the answer to this question is "yes", then the program proceeds to the point 234 where the first absolute throttle valve position value TVO1ND is selected for the absolute throttle valve position value and the program proceeds to the point 238. Otherwise, the problem proceeds to the point 236 where the second absolute throttle valve position value TVO2ND is selected for the absolute throttle valve position value and then the program proceeds to the point 238.

Figure 4B:
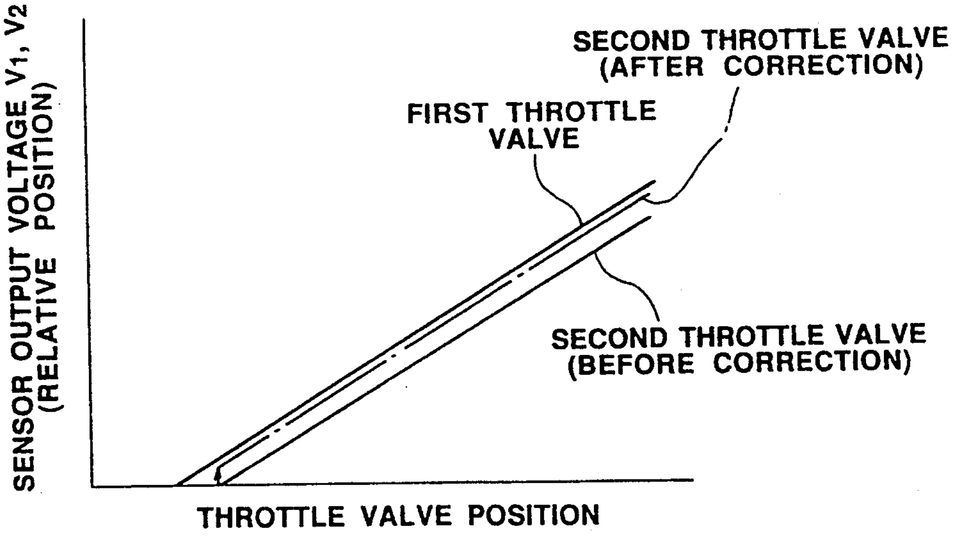

At the point 238 in the program, the second relative throttle valve position value TVO2AB is corrected by adding the constant, K to the second relative throttle valve position value TVO2AB. The corrected second relative throttle valve position value TVO2AB is used to update the last second relative throttle valve position value stored in the computer memory. Since the second relative throttle valve position value TVO2AB is the existing angle of rotation of the second throttle valve 40 with respect to its minimum position, it is not corrected for the difference between the output voltages produced from the first and second throttle sensors 36 and 48 when the first and second throttle valves 20 and 40 are in their minimum positions. This correction is indicated by an arrow directed upward in FIG. 4B. The first and second relative throttle valve position values TVO1AB and TVO2AB are used to make determinations as to whether or not a fuel enrichment control for acceleration, a fuel reduction control for deceleration, and/or a spark-timing retard control for engine starting should be cancelled.

At the point 240 in the program, a determination is made as to whether or not the first relative throttle valve position value TVO1AB is equal to or less than the second relative throttle valve position value TVO2AB. If the answer to this question is "yes", then the program proceeds to the point 242 where the first relative throttle valve position value TVO1AB is selected for the relative throttle valve position value and the program proceeds to the point 246. Otherwise, the program proceeds to the point 244 where the second relative throttle valve position value TVO2AB is selected for the relative throttle valve position value and then the program proceeds to the point 246. At the point 246 in the program, the computer program is returned to the entry point 202.

According to the invention, the deviation between the values of the first and second sensor signals indicative of the positions of the first and second throttle valves for the same throttle valve position can be compensated. It is, therefore, possible to ensure an accurate comparison between the first and second sensor signals and to provide an accurate fuel delivery control.

What is claimed is:

1. An apparatus for use with an internal combustion engine having first and second throttle valves located in series within an engine induction passage, said apparatus comprising:

first sensor means associated with said first throttle valve for deriving a first sensor signal indicative of a position of said first throttle valve with respect to a reference position;

second sensor means associated with said second throttle valve for deriving a second sensor signal indicative of a position of said second throttle valve with respect to a reference position; and a circuit connected to said first and second sensor means and including first means for detecting a first minimum value of said first sensor signal obtained when said first throttle valve is at a minimum position, second means for detecting a second minimum value of said second sensor signal obtained when said second throttle valve is at a minimum position, means for calculating a difference between said first and second minimum values, first means for correcting one of said first and second sensor signals in a direction zeroing said difference, and second means for correcting said one of said first and second sensor signals, corrected by said first correcting means, based upon a constant corresponding to a difference between said minimum positions of said first and second throttle valves.

2. The apparatus as claimed in claim 1, wherein said constant is equal to a change in said first sensor signal when said first throttle valve changes from its minimum position to said minimum position of said second throttle valve.

3. An apparatus for use with an internal combustion engine having first and second throttle valves located in series within an engine induction passage, said apparatus comprising:

first sensor means associated with said first throttle valve for deriving a first sensor signal indicative of a position of said first throttle valve with respect to a reference position;

second sensor means associated with said second throttle valve for deriving a second sensor signal indicative of a position of said second throttle valve with respect to a reference position, said second sensor signal having a value greater than a value of said first sensor signal for the same throttle position; and a circuit connected to said first and second sensor means and including first means for detecting a first minimum value of said first sensor signal obtained when said first throttle valve is at a minimum position, second means for detecting a second minimum value of said second sensor signal obtained when said second throttle valve is at a minimum position, means for calculating a difference of said second minimum value from said first minimum value, means for adding said difference to said second sensor signal to correct said second sensor signal to produce a corrected second sensor signal, and means for adding a constant to said corrected second sensor signal to further correct said corrected second sensor signal, said constant corresponding to a difference between said minimum positions of said first and second throttle valves.

4. The apparatus as claimed in claim 3, wherein said constant is equal to a change in said first sensor signal when said first throttle valve changes from its minimum position to said minimum position of said second throttle valve.

* * * * *